(12) United States Patent
Tidwell et al.

(10) Patent No.: US 10,509,591 B2
(45) Date of Patent: *Dec. 17, 2019

(54) DISTRIBUTED POWER MANAGEMENT FOR NON-VOLATILE MEMORY CONTROLLERS USING AVERAGE AND PEAK POWER CREDITS ALLOCATED TO MEMORY CHANNELS

(71) Applicant: SanDisk Technologies LLC, Plano, TX (US)

(72) Inventors: Reed P. Tidwell, Centerville, UT (US); Steven T. Sprouse, San Jose, CA (US); Satish B. Vasudeva, Fremont, CA (US); James M. Higgins, Chandler, AZ (US); Jonathan Q. Tu, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/648,417

(22) Filed: Jul. 12, 2017

(65) Prior Publication Data
US 2018/0335978 A1 Nov. 22, 2018

Related U.S. Application Data

(60) Provisional application No. 62/508,319, filed on May 18, 2017, provisional application No. 62/508,313, filed on May 18, 2017.

(51) Int. Cl.
*G06F 3/06* (2006.01)
*G06F 1/28* (2006.01)

(52) U.S. Cl.
CPC .............. *G06F 3/0659* (2013.01); *G06F 1/28* (2013.01); *G06F 3/0604* (2013.01); *G06F 3/0653* (2013.01); *G06F 3/0688* (2013.01)

(58) Field of Classification Search
CPC .... G06F 3/0659; G06F 3/0688; G06F 3/0625; G06F 3/0653; G06F 1/28; G06F 3/0604;
(Continued)

(56) References Cited

U.S. PATENT DOCUMENTS 9,727,267 B1 * 8/2017 Sebastian .............. G06F 3/0625
2013/0275781 A1 * 10/2013 Ramage ................ G06F 1/3275
713/300

(Continued)

*Primary Examiner* — Zhuo H Li
(74) *Attorney, Agent, or Firm* — Morgan, Lewis & Bockius LLP

(57) ABSTRACT

In a memory system having a storage controller and a plurality of distinct sets of non-volatile memory devices, each respective channel controller of a plurality of channel controllers, each channel controller corresponding to a distinct set of the plurality of distinct sets of non-volatile memory devices, receives power credits allocated by the storage controller, including an average power credit and a peak power credit; and while executing commands in the one or more command queues, limits execution of said commands in accordance with the received average power credit and the received peak power credit. In some embodiments, a total number of average power credits allocated by the storage controller is variable and a total number of peak power credits allocated by the storage controller is fixed.

19 Claims, 8 Drawing Sheets

(58) Field of Classification Search
 CPC ...... G06F 1/3275; G06F 3/061; G06F 1/3206;
  Y02D 10/14; Y02D 10/13
 See application file for complete search history.

(56) References Cited

U.S. PATENT DOCUMENTS

2016/0085290 A1* 3/2016 Skandakumaran ... G06F 1/3268
  713/320
2018/0335977 A1* 11/2018 Tidwell ................ G06F 3/0659

* cited by examiner

Channel Controller

420 Execute commands in the one or more command queues, including limiting execution of said commands in accordance with the received power credits (A)

426 Limiting execution of said commands includes deferring execution in accordance with a determination that a command requires power credits in excess of power credits available in the channel controller

428 Each command type has an assigned number of power credits, wherein execution of a respective command is deferred if the number of power credits assigned to the command type of the respective command exceeds the power credits available

432 Update the power credits available in the channel controller in accordance with the number of power credits in use based on commands currently being executed.

Figure 4B

518 Execute commands in the one or more command queues, including limiting execution of said commands in accordance with the received average power credits and peak power credits (A)

522 Limiting execution of said commands includes deferring execution in accordance with a determination that a command requires average power credits in excess of average power credits available in the channel controller

524 Each command type has an assigned number of average power credits, wherein execution is deferred if the number of average power credits assigned to command type exceeds average power credits available

526 Limiting execution of said commands includes deferring execution in accordance with a determination that a command requires peak power credits in excess of peak power credits available in the channel controller

528 Each command type has an assigned number of peak power credits, wherein execution is deferred if the number of peak power credits assigned to command type exceeds average power credits available

532 Update the average power credits and peak power credits available in the channel controller in accordance with the number of average power credits in use and peak power credits in use based on commands currently being executed

Figure 5B

DISTRIBUTED POWER MANAGEMENT FOR NON-VOLATILE MEMORY CONTROLLERS USING AVERAGE AND PEAK POWER CREDITS ALLOCATED TO MEMORY CHANNELS

RELATED APPLICATIONS

This application claims priority to U.S. Provisional Patent Application Nos. 62/508,319, filed on May 18, 2017, and 62/508,313, filed on May 18, 2017 both of which are hereby incorporated by reference in their entireties.

TECHNICAL FIELD

The disclosed embodiments relate generally to storage controller systems, and in particular, to credit-based power management in storage systems.

BACKGROUND

Semiconductor storage systems are commonly used for storing and managing data for electronic devices. A typical non-volatile data storage system stores data as an electrical value in the memory cells of the storage system and memory controllers are generally tasked with managing data transactions across multiple memory devices of the storage system.

Data transactions in data storage systems are generally carried out by executions of memory commands. To facilitate this process, memory controllers are often constructed with command queues that help optimize command executions across multiple memory cells. Multiple commands executed in parallel across the storage system, however, can result in spikes in power consumption.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to manage power consumption in storage devices (e.g., solid-state drives, sometimes called SSD's). In one aspect, a storage device includes a storage controller, and one or more non-volatile memory controllers coupled to the storage controller. The storage device also includes a plurality of non-volatile memory devices, each non-volatile memory device in the plurality of non-volatile memory devices coupled to a particular channel controller of the one or more channel controllers. The storage controller is configured to obtain backlog information from the channel controllers. The storage device is further configured to, in accordance with the obtained backlog information, allocate credits to channel controllers, and the channel controllers limit execution of pending memory commands in accordance with the allocated power credits.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 4A-4B illustrate a flowchart representation of a method of allocating power credits to one or more channel controllers and limiting execution of commands in a command queue, in accordance with some embodiments.

FIGS. 5A-5B illustrate a flowchart representation of a method of allocating power credits to one or more channel controllers and limiting execution of commands in a command queue, in accordance with some embodiments.

Figure 1:
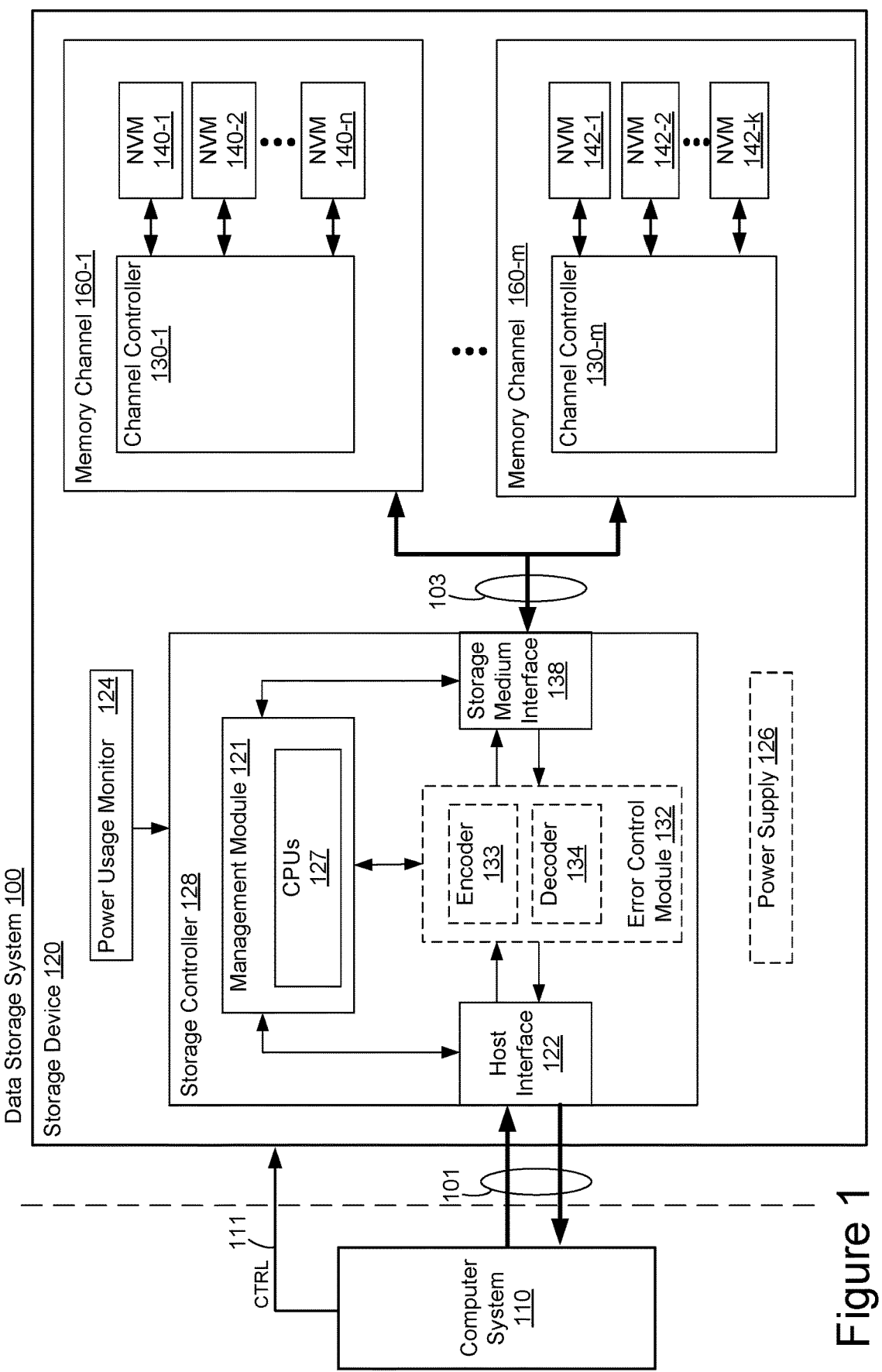
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to manage power consumption in memory systems. Some embodiments include systems, methods, and/or devices to defer execution of pending memory commands.

(A1) In one aspect, a method of operation in a memory system having a storage controller and a plurality of distinct sets of non-volatile memory devices includes, at each respective channel controller of a plurality of channel controllers, each channel controller corresponding to a distinct set of the plurality of distinct sets of non-volatile memory devices and having one or more command queues for holding the channel controller's pending commands, determining a backlog of the respective channel controller. The method further includes, at each respective channel controller, receiving power credits allocated by the storage controller based at least in part on the backlog of the respective channel controller, and executing commands in the one or more command queues of the respective channel controller, including limiting execution of said commands in accordance with the received power credits.

(A2) In some embodiments of the method of A1, limiting execution of said commands includes deferring execution of a respective command in the one or more command queues in accordance with a determination that executing the respective command would require power credits in excess of power credits available in the respective channel controller.

(A3) In some embodiments of the method of A2, said commands include commands having different command types, each command type having an assigned number of power credits, and each respective channel controller defers execution of a respective command of the respective channel controller's pending commands in accordance with a determination that the number of power credits assigned to the command type of the respective command exceeds the power credits available in the respective channel controller.

(A4) In some embodiments of the method of any of A2-A3, the method further includes, at each respective channel controller, updating the power credits available in the respective channel controller by reducing the available power credits when execution of a respective command is initiated, and increasing the available power credits when execution of the respective command completes.

(A5) In some embodiments of the method of any of A2-A3, the method further includes, at each respective channel controller, determining a number of in use power credits, based on commands currently being executed by the respective channel controller, and determining the power credits available in the respective channel controller in accordance with the received power credits allocated by the storage controller and the in use power credits.

(A6) In some embodiments of the method of any of A1-A5, the method further includes, at the storage controller, receiving backlog information from each respective channel controller of the plurality of channel controllers, and distributing power credits to each respective channel controller of the plurality of channel controllers based on a total number of power credits and the backlog of the respective channel controller.

(A7) In some embodiments of the method of A6, the method further includes, at the storage controller, adjusting the total number of available power credits based at least in part on one or more board power measurements and/or one or more temperature measurements.

(A8) In some embodiments of the method of any of A1-A7, the method includes, at each respective channel controller, determining a backlog score in accordance with a count of commands whose execution was deferred, in an epoch prior to a current epoch, in accordance with a determination that executing those commands would have required power credits in excess of power credits available in the respective channel controller during the prior epoch.

(A9) In some embodiments of the method of any of A1-A7, the method includes, at each respective channel controller, determining a backlog score based at least in part on pending commands in the one or more command queues of the respective channel controller.

(A10) In some embodiments of the method of A9, the method includes, at each respective channel controller, determining a backlog score based at least in part on respective ages of one or more of the commands in the one or more command queues of the respective channel controller.

(A11) In some embodiments of the method of any of A1-A10, the one or more command queues include a high priority queue for read commands and at least one low priority queue for write and erase commands.

(A12) In some embodiments of the method of any of A1-A11, at each respective channel controller, receiving during each epoch of a sequence of epochs, a power credit allocation for the epoch, and limiting execution of said commands in the one or more command queues, during each said epoch, in accordance with the received power credit allocation for the epoch.

(A13) In some embodiments of the method of any of A1-A12, at each respective channel controller, a next command is selected for execution, from among said commands in the one or more command queues, in accordance with predefined command selection criteria.

(A14) In another aspect, some embodiments include a memory system having a plurality of distinct sets of non-volatile memory devices, a storage controller, and a plurality of channel controllers, each channel controller corresponding to a distinct set of the plurality of distinct sets of non-volatile memory devices. Each respective channel controller contains one or more command queues for holding the respective channel controller's pending commands and is configured to determine a backlog of the respective channel controller (e.g., in accordance with pending commands in the one or more command queues waiting for execution); receive power credits allocated by the storage controller, based at least in part on the backlog of the respective channel controller; and execute commands in the one or more command queues, including limiting execution of said commands in accordance with the received power credits.

(A15) In some embodiments, the memory system of A13 is configured to perform the method of any of A2-A13.

(B1) In another aspect, some embodiments include a method of operation in a memory system having a storage controller and a plurality of distinct sets of non-volatile memory devices. In some embodiments, the method includes, at each respective channel controller of a plurality of channel controllers, each channel controller corresponding to a distinct set of the plurality of distinct sets of non-volatile memory devices, each respective channel controller having one or more command queues for holding the respective channel controller's pending commands: receiving power credits allocated by the storage controller, including an average power credit and a peak power credit; and executing commands in one or more command queues, including limiting execution of said commands in accordance with the received average power credits and the received peak power credits.

(B2) In some embodiments of the method of B1, the method further comprises, at the storage controller, allocating a variable total number of average power credits and allocating a fixed total number of peak power credits.

(B3) In some embodiments of the method of B2, the method further includes determining the total number of peak power credits based on characteristics of the memory system.

(B4) In some embodiments of the method of any of B2-B3, the method further includes adjusting the total number of average power credits based at least in part on one or more board power measurements and/or one or more temperature measurements.

(B5) In some embodiments of the method of B4, the method further comprises adjusting the total number of average power credits at fixed time intervals.

(B6) In some embodiments of the method of B1-B5, limiting execution includes deferring execution of a respective command in the one or more command queues in accordance with a determination that executing the respective command would require average power credits in excess of average power credits available in the respective channel controller or that executing the respective command would require peak power credits in excess of peak power credits available in the respective channel controller.

(B7) In some embodiments of the method of B6, said commands include commands having different command types, each command type having an assigned number of average power credits and peak power credits, and each respective channel controller is configured to defer execution of a respective command of the pending commands in accordance with a determination that the number of average power credits assigned to the command type of the respective command exceeds the average power credits available in the respective channel controller or the peak power credits assigned to the command type of the respective command exceeds the peak power credits available in the respective channel controller.

(B8) In some embodiments of the method of any of B6-B7, the method further comprises, at each respective channel controller, updating the average power credits and the peak power credits available in the respective channel controller by reducing the available average power credits and the available peak power credits when execution of a respective command is initiated, and increasing the available average power credits and available peak power credits when execution of the respective command completes.

(B9) In some embodiments of the method of any of B6-B7, the method further comprises, at each respective channel controller: (1) determining a number of in use average power credits, based on commands currently being executed by the respective channel controller, and determining the average power credits available in the respective channel controller in accordance with the received average power credits allocated by the storage controller and the number of in use average power credits; and (2) determining a number of in use peak power credits, based on commands currently being executed by the respective channel controller, and determining the peak power credits available in the respective channel controller in accordance with the received peak power credits allocated by the storage controller and the number of in use peak power credits.

(B10) In some embodiments of the method of any of B1-B9, the method includes, at each respective channel controller, receiving during each epoch of a sequence of epochs, an average power credit allocation and a peak power credit allocation for the epoch, and limiting execution of said commands in the one or more command queues, during each said epoch, in accordance with the received average power credit allocation and the received peak power credit allocation for the epoch.

(B11) In some embodiments of the method of any of B1-B10, the method includes, including, at each respective channel controller of the plurality of channel controllers, determining a backlog of the respective channel controller and providing the determined backlog to the storage controller; and the average power credit received by each respective channel controller is based at least in part on the determined backlog provided by the respective channel controller to the storage controller.

(B12) In some embodiments of the method of B11, each respective channel controller determines determine the backlog score of the respective channel controller in accordance with a count of commands whose execution was deferred by the respective channel controller, in an epoch prior to a current epoch, in accordance with a determination that executing those commands would have required power credits in excess of power credits available in the respective channel controller during the prior epoch.

(B13) In some embodiments of the method of B11, each respective channel controller determines the backlog score of the respective channel controller in accordance with pending commands in the one or more command queues waiting for execution.

(B14) In another aspect, some embodiments include a memory system having a plurality of distinct sets of non-volatile memory devices; a storage controller; and a plurality of channel controllers, each channel controller corresponding to a distinct set of the plurality of distinct sets of non-volatile memory devices. Each respective channel controller contains one or more command queues and is configured to: receive power credits allocated by the storage controller, including an average power credit and a peak power credit; and execute commands in the one or more command queues, including limiting execution of said commands in accordance with the received average power credit and the received peak power credit.

(B15) In some embodiments of the memory system of B14, the memory system is further configured to operate in accordance with the method any of B2-B13.

(B16) In yet another aspect, some embodiments include a non-transitory computer-readable storage medium storing one or more programs for execution by one or more processors of a storage device, the one or more programs including instructions for performing any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120, which includes storage controller 128, power usage monitor 124 (e.g., a current sensor or power sensor, and/or one or more temperature sensors), power supply 126, and one or more memory channels 160 (e.g., memory channels 160-1 to 160-m). The storage device 120 is used in conjunction with or includes computer system 110 (e.g., a host system or a host computer).

Computer system 110 is coupled to storage device 120 through data connections 101. However, in some implementations computer system 110 includes storage device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

Storage controller 128 includes host interface 122, management module 121, error control module 132, and storage medium interface 138. Storage controller 128 is connected to computer system 110 through host interface 122 and data connections 101.

Host interface 122 provides storage controller 128 with an interface to computer system 110 through data connections 101. Similarly, storage medium interface 138 provides storage controller 128 with an interface to storage medium 161 though connections 103. Connections 103 are sometimes called data connections, but typically convey commands in addition to data, and optionally convey metadata, error correction information and/or other information in addition to data values to be stored in memory channels 160 and data values read from memory channels 160. In some implementations, storage medium interface 138 includes read and write circuitry, including circuitry capable of providing read signals to memory channels 160 (e.g., signals representing threshold voltages to be used when reading data from NAND-type flash memory). In some embodiments, connections 101 and connections 103 are implemented as communication media over which commands and data are communicated, and each of these connections uses a protocol such as DDR3, SCSI, SATA, SAS, or the like for handling such communications.

In some implementations, management module 121 includes one or more processing units 127 (sometimes herein called CPUs, processors, or hardware processors, and sometimes implemented using microprocessors, microcontrollers, or the like) configured to execute instructions in one or more programs (e.g., in management module 121). In some implementations, the one or more processing units 127 are shared by one or more components within, and in some cases, outside storage controller 128. Management module 121 is coupled to host interface 122, error control module 132, and storage medium interface 138 in order to coordinate the operation of these components.

Error control module 132 is coupled to host interface 122, management module 121, and storage medium interface 138. Error control module 132 is provided to limit the number of uncorrectable errors inadvertently introduced into data. In some embodiments, error control module 132 includes an encoder 133 and a decoder 134. Encoder 133 encodes data by applying an error control code to produce a codeword, which is subsequently stored in non-volatile memory (e.g., in one of NVM devices 140, 142). In some embodiments, when the encoded data (e.g., one or more codewords) is read from non-volatile memory (e.g., in one of NVM devices 140, 142, in one or more memory channels 160), decoder 134 applies a decoding process to the encoded data to recover the data, and to correct errors in the recovered data within the error correcting capability of the error control code. For the sake of brevity, an exhaustive description of the various types of encoding and decoding algorithms generally available and known to those skilled in the art is not provided herein.

In some embodiments, error control module 132 includes one or more hardware processing units. In some embodiments, error control module 132 is implemented using a hardware state machine, and in some embodiments, error control module 132 is implemented in an application-specific integrated circuit (ASIC). In some embodiments, error control module 132 uses one or more error detection and/or correction schemes, such as Hamming, Reed-Solomon (RS), Bose Chaudhuri Hocquenghem (BCH), and low-density parity-check (LDPC), or the like.

In some embodiments, each memory channel 160 coupled to storage controller 128 through connections 103 includes a channel controller 130, or alternatively one or more channel controllers, and one or more NVM devices 140, 142 (e.g., flash memory die). In some embodiments, each channel controller 130 includes one or more processing units 202 (sometimes herein called CPUs, processors, or hardware processors, and sometimes implemented using microprocessors, microcontrollers, or the like) configured to execute instructions in one or more programs (e.g., one or more programs stored in controller memory of the channel controller). In some embodiments, NVM devices 140 (e.g., NVM devices 140-1 through 140-$n$), 142 (e.g., NVM devices 142-1 through 142-$k$) are coupled to channel controllers 130 through connections that convey commands in addition to data, and optionally convey metadata, error correction information and/or other information in addition to data values to be stored in NVM devices 140, 142 and data values read from NVM devices 140, 142.

In some embodiments, storage device 120, memory channels 160, and/or NVM devices 140, 142 are configured for enterprise storage suitable for applications such as cloud computing, or for caching data stored (or to be stored) in secondary storage, such as hard disk drives. Additionally and/or alternatively, storage device 120, memory channels 160, and/or NVM devices 140, 142 are configured for relatively smaller-scale applications such as personal flash drives or hard-disk replacements for personal, laptop and tablet computers. While in some embodiments NVM devices 140, 142 are flash memory devices and channel controllers 130 are flash memory controllers or solid state storage controllers, in other embodiments storage device 120 may include other types of non-volatile memory devices and corresponding controllers.

In some implementations, a respective memory channel 160 of the memory channels 160-1 to 160-M includes a single NVM device, while in other implementations the respective memory channel includes a plurality of NVM devices. In some implementations, NVM devices 140, 142 include NAND-type flash memory or NOR-type flash memory. Further, in some implementations, each channel controller 130 comprises a solid-state drive (SSD) controller.

In some embodiments, NVM devices 140, 142 are flash memory chips or die, sometimes herein called flash memory devices. Each NVM device includes a number of addressable and individually selectable blocks. In some implementations, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, for example, 64 pages, 128 pages, 256 pages or another suitable number of pages. Each page or word line is typically an instance of the smallest individually accessible (readable) portion in a block. In some implementations (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, the blocks in each NVM device are grouped into a plurality of zones or planes. Each zone or plane can be independently managed to some extent, which increases the degree of parallelism for parallel operations, such as reading and writing data to NVM devices 140, 142.

As noted above, in some embodiments, data is written to a storage medium in pages, but the storage medium is erased in blocks. As a result, some of the pages in the storage medium may contain invalid (e.g., stale) data, but those pages cannot be overwritten until the entire block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written.

A phenomenon related to garbage collection is write amplification. Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

During a write operation, host interface 122 receives a write command, which includes data to be stored in storage device 120 from computer system 110. The received data, sometimes called write data, is encoded using encoder 133 of storage controller 128 to produce encoded data, typically in the form of one or more codewords. The resulting encoded data is stored in non-volatile memory of a particular memory channel 160.

During a read operation, host interface 122 receives a read command from computer system 110. In response, data read from non-volatile memory of a particular memory channel 160 is decoded using decoder 134 of storage controller 128 to produce decoded data. The resulting decoded data, sometimes called read data, is provided to computer system 110 in response to the read command, via host interface 122.

As explained above, a storage medium (e.g., NVM devices 140, 142) is divided into a number of addressable and individually selectable blocks and each block is optionally (but typically) further divided into a plurality of pages and/or word lines and/or sectors (which are sub-portions of pages). While erasure of a storage medium is performed on a block basis, in many embodiments, reading and programming of the storage medium is performed on units of memory that are smaller than a block, such as a page or word line or sector of a page, each of which has multiple memory cells (e.g., single-level cells or multi-level cells). For example, in some embodiments, programming is performed on an entire page. In some embodiments, a multi-level cell (MLC) NAND flash typically has four possible states per cell, yielding two bits of information per cell. Further, in some embodiments, a MLC NAND has two page types: (1) lower pages (sometimes called fast pages), and (2) upper pages (sometimes called slow pages). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (e.g., TLC, MLC, or SLC and/or a chosen data redundancy mechanism) is a choice made (or implemented) when data is actually written to the storage media.

Flash memory devices (e.g., NVM 140, 142) utilize memory cells (e.g., SLC, MLC, and/or TLC) to store data as electrical values, such as electrical charges or voltages. Each flash memory cell typically includes a single transistor with a floating gate that is used to store a charge, which modifies the threshold voltage of the transistor (e.g., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

Storage controller 128 is coupled to computer system 110 and channel controllers 130. In some embodiments, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication with computer system 110, such as double data rate type three synchronous dynamic random access memory (DDR3). In some embodiments, storage device 120 is or includes a solid-state drive implemented as a dual in-line memory module (DIMM) device, compatible with a DIMM memory slot. For example, in some embodiments, storage device 120 is compatible with a 240-pin DIMM memory slot using a DDR3 interface specification.

In some embodiments, storage controller 128 and storage medium interface 138 use a defined interface standard for communication with memory channels 160 and their storage controllers 130, such as serial advance technology attachment (SATA). In some other embodiments, the device interface used by storage controller 128 and storage medium interface 138 to communicate with channel controllers 130 is SAS (serial attached SCSI), or other storage interface.

In some embodiments, power usage monitor 124 is coupled to and provides board power measurement(s) and/or temperature measurements to storage controller 128. In some embodiments, power usage monitor 124 includes sensors and/or circuitry for measuring and monitoring power consumption by storage device 120 or one or more subsystems of storage device 120, and/or sensors and/or circuitry for measuring temperature of storage device 120 or one or more subsystems of storage device 120. In some embodiments, the subsystem for which power and/or temperature is monitored includes all the memory channels of storage device 120 (e.g., all the channel controllers 130 and all the NVM devices 140, 142 controlled by the channel controllers). In another example, the subsystem for which power and/or temperature is monitored by power usage monitor 124 includes all the NVM devices 140, 142 in the memory channels of storage device 120, but not the channel controllers 130, storage controller 128 and host interface 122. Various embodiments of power usage monitor 124 are described below with reference to FIG. 3B.

In some embodiments, storage device 120 includes power supply 126. Power supply 126 outputs one or more power supply voltages to storage device 120 for use by storage controller 128 and memory channels 160. Power supply 126 is discussed in more detail below with reference to FIG. 3A.

Optionally, storage device 120 includes various additional features that have not been illustrated for the sake of brevity and so as not to obscure more pertinent features of the example embodiments disclosed herein, and a different arrangement of features may be possible. Similarly, storage controller 128 may include various additional features that have not been illustrated for the sake of brevity and so as not to obscure more pertinent features of the example implementations disclosed herein, and that a different arrangement of features may be possible.

Figure 2A:
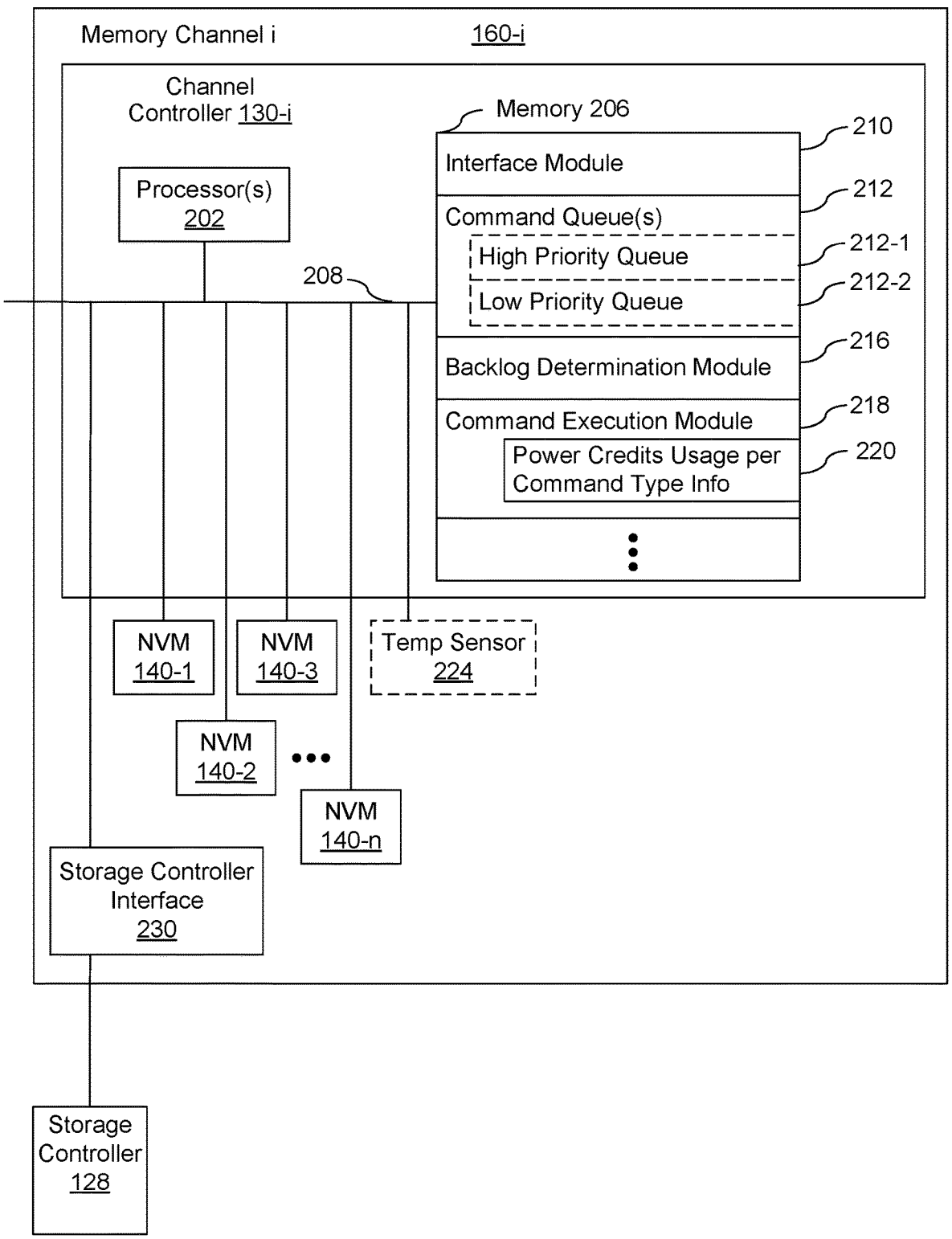
FIG. 2A is a block diagram illustrating an implementation of a memory channel, including a channel controller, in accordance with some embodiments.

FIG. 2A is a block diagram illustrating an implementation of a respective memory channel 160-*i*, sometimes herein called memory channel i, and storage controller 128, in accordance with some embodiments. Memory channel i is a respective memory channel of a plurality of memory channels 160-1 to 160-*m*, as shown in FIG. 1. In some embodiments, memory channel i includes channel controller 130-*i*, NVM devices 140-1 through 140-*n*, and storage controller interface 230, which couples memory channel i to storage controller 128. Optionally, in some embodiments, memory channel i includes temperature sensor 224 to measure the temperature in memory channel i and to provides temperature information (e.g., temperature measurements) to storage controller 128, for example via storage controller interface 230.

In some embodiments, channel controller 130-*i* includes one or more processing units 202 (sometimes herein called CPUs, processors, or hardware processors, and sometimes implemented using microprocessors, microcontrollers, or the like) for executing modules, programs and/or instructions stored in memory 206 (sometimes called controller memory or channel controller memory) and thereby performing processing operations, memory 206, and one or more communication buses 208 for interconnecting these components. Communication buses 208 optionally include circuitry (sometimes called a chipset) that interconnects and controls communications between system components.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processing unit(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:
  interface module 210, which is used for handling communications with storage controller 128;
  command queue(s) 212 that store commands corresponding to various operations (e.g., read, write and erase) which, when executed, operate on data held within the memory channel's NVM devices (e.g., NVM devices 140); in some embodiments, a respective memory channel has a high priority queue 212-1 and one or more low priority queues 212-2; in some embodiments, one or more queues also store command ages (as discussed below with reference to FIG. 3A);
  backlog determination module 216, which determines a backlog based on pending commands in the one or more command queues 212 waiting for execution; and
  command execution module 218, which dispatches commands from one or more command queues 212 to NVM devices 140 in memory channel i for execution; power credits usage per command type information 220 is used to determine whether to defer execution of commands in one or more command queues (e.g., command queue 212) in accordance with the command type of the pending command in the one or more command queues (as discussed below with reference to FIG. 3A).

In some embodiments, the one or more command queues 212 in a respective channel controller 130 are used to hold commands waiting for execution by a set of NVM devices 140 or 142 coupled to the respective channel controller 130. A respective command queue 212, when not empty, contains one or more commands corresponding to read, write and/or erase operations for reading data from, writing data to, or erasing data from a corresponding set of NVM devices (e.g., NVM devices 140). In some embodiments, commands in command queue(s) 212 include host commands received from computer system 110, while in some other embodiments, commands in command queue(s) 212 include memory operation commands derived from or determined from host commands received from computer system 110. For example, multiple memory operation commands may derived from (and thus correspond to) a single host command, and it is the multiple memory operation commands that are stored in one or more command queues 212 of one or more memory channels 160. The combination of a set of NVM devices 140 (e.g., NVM devices 140-1 through 140-*n*), and a corresponding channel controller 130 (e.g., channel controller 130-*i*) is sometimes referred to as a memory channel (e.g., memory channel i). Storage device 120 can include as many memory channels as there are distinct sets of NVM devices to which commands can be dispatched in parallel by a set of channel controllers 130.

In some embodiments, command execution module 218 includes power credits usage per command type information 218-1 and logic for determining whether to defer execution of commands in one or more command queue(s) 212. In some embodiments, command execution module 218 limits execution of commands in command queue(s) 212 in accordance with power credits received from storage controller 128. In some embodiments, command execution module 218 selects a next command for execution in accordance with predefined selection criteria. The command selection criteria may include the age of the commands, the order of the commands in each command queue 212, giving priority to commands in a high priority queue 212-1, and the amount of power credits required by each command in the one or more command queues (e.g., if a new command requires more power credits than the available power credits, another command requiring fewer power credits may be selected).

In some embodiments, in a respective memory channel 160-i, command execution module 218 dispatches some commands from a respective command queue 212 to non-volatile memory devices (e.g., NVM devices 140 or 142) in that memory channel, but defers dispatching other commands from the respective command queue 212, or from another command queue 212, to the non-volatile memory devices in the memory channel, as further described below with reference to FIGS. 4A-4B and 5A-5B.

In some embodiments, storage controller interface 230 and interface module 210 receive, from storage controller 128, memory operation commands, such as read, write (also called program), and/or erase commands, as well as power credits. Further, in some embodiments, storage controller interface 230 and interface module 210 send to storage controller 128 backlog information, as described in more detail below.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions, that when executed by the one or more processors 202, implement at least those portions of the methods described below with reference to FIGS. 4A-4B and 5A-5B that are performed by or within a respective memory channel i.

Although FIG. 2A shows memory channel i, FIG. 2A is intended more as a functional description of the various features which may be present in a memory channel than as a structural schematic of the embodiments described herein. In practice, and as recognized by those of ordinary skill in the art, items shown separately could be combined and some items could be separated. In addition, in some other embodiments, one or more of the functions described herein as being performed by processing unit(s) 202 are instead performed by storage controller 128.

Figure 2B:
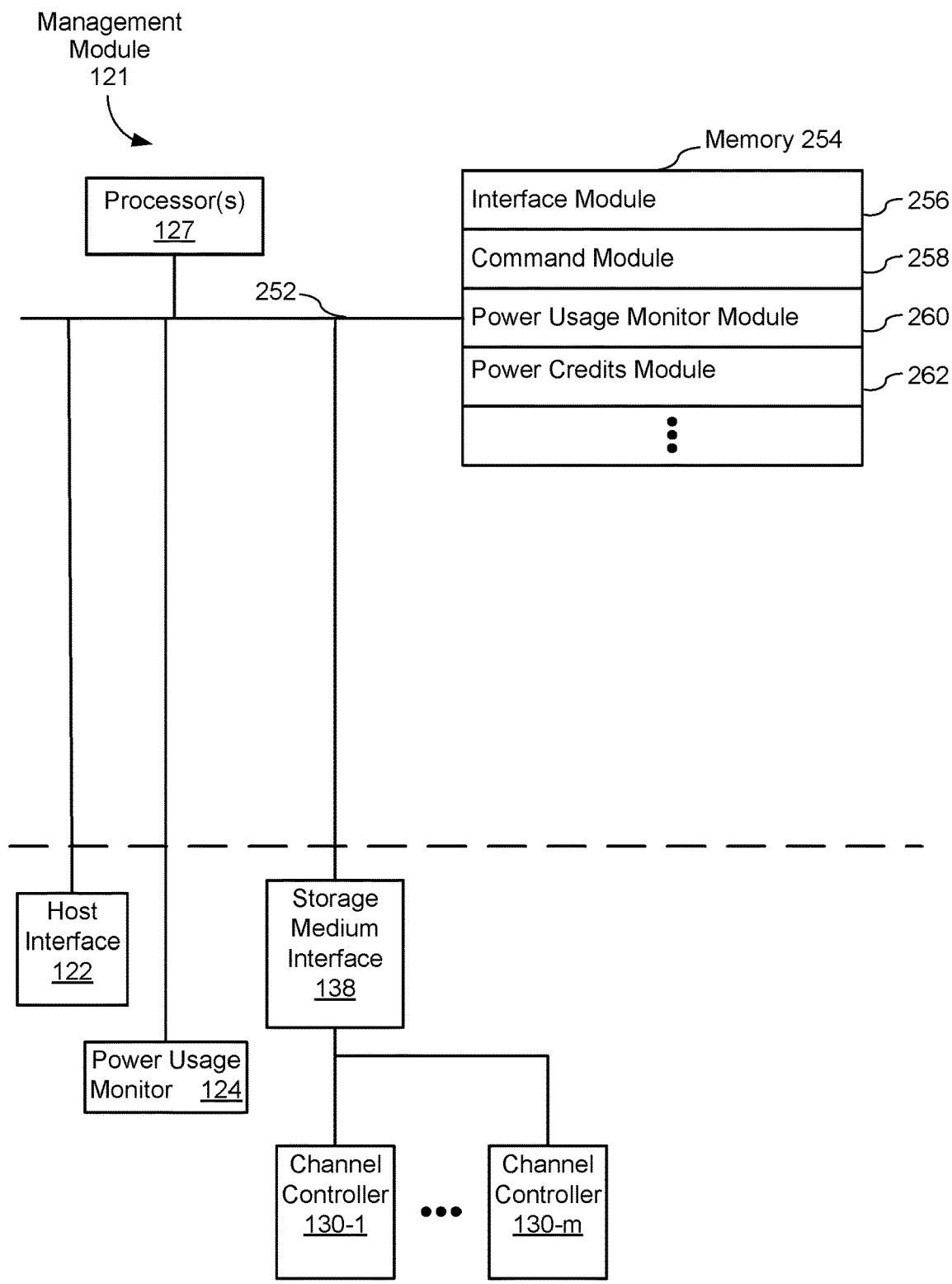
FIG. 2B is a block diagram illustrating an implementation of a management module, in accordance with some embodiments.

FIG. 2B is a block diagram illustrating an implementation of management module 121, in storage controller 128 (see FIG. 1), in accordance with some embodiments. Management module 121 typically includes: one or more processing units 127 (sometimes herein called CPUs, processors, or hardware processors, and sometimes implemented using microprocessors, microcontrollers, or the like) for executing modules, programs and/or instructions stored in memory 254 (sometimes herein called controller memory) and thereby performing processing operations; memory 254; and one or more communication buses 252 for interconnecting these components. One or more communication buses 252, optionally, include circuitry (sometimes called a chipset) that interconnects and controls communications between system components.

Figure 3A:
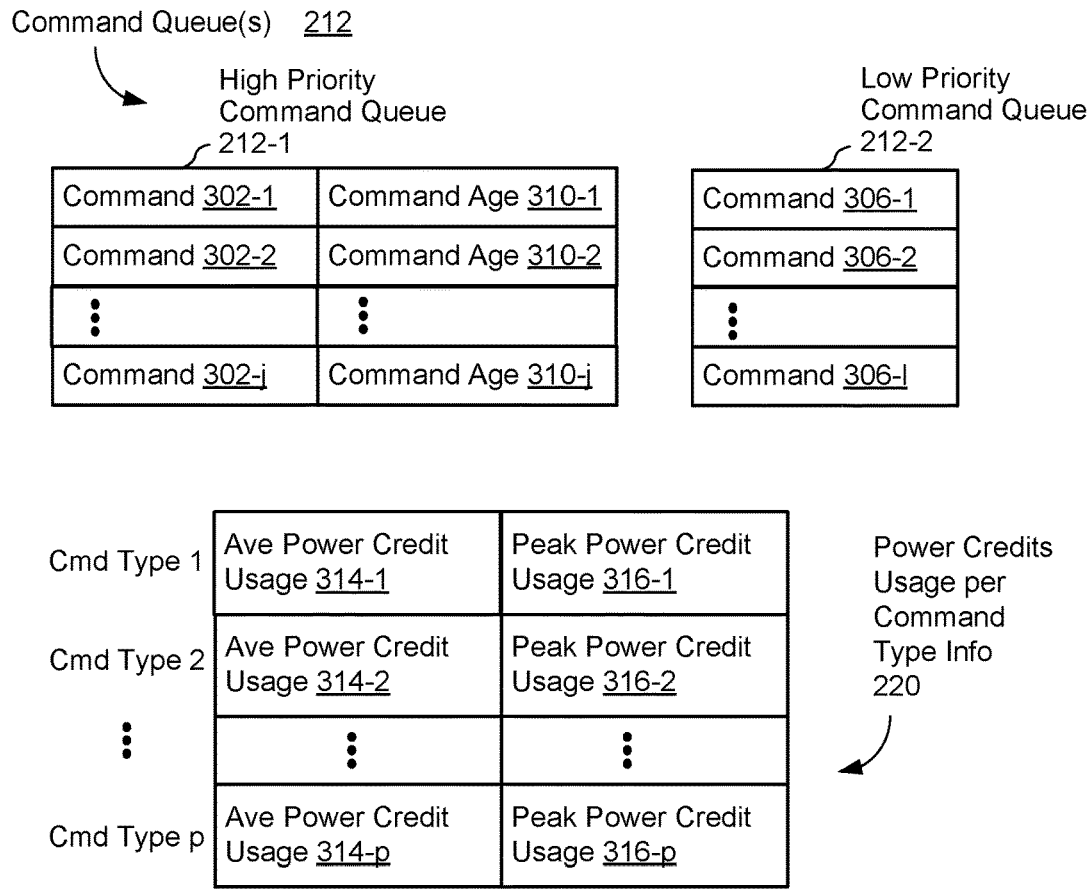
FIG. 3A is a block diagram illustrating an implementation of command queues and a data structure storing information corresponding to power credits usage for each command type of a plurality of commands types, in accordance with some embodiments.
Figure 3B:
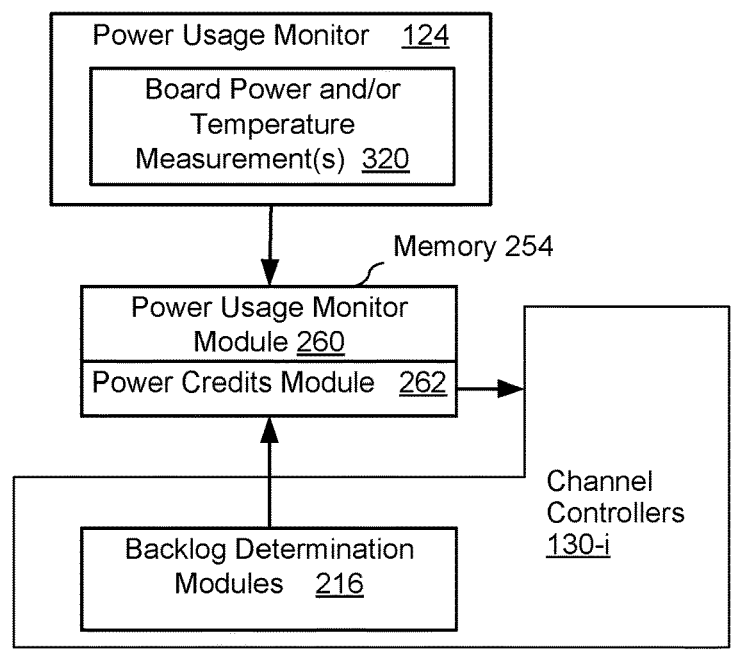
FIG. 3B is a block diagram illustrating acquisition of board power measurement(s) and backlog information, which is processed by a management module, in accordance with some embodiments.

Management module 121 is operatively coupled to host interface 122, power usage monitor 124, and storage medium interface 138 by communication buses 252, and to channel controllers 130 (e.g., channel controller 130-1 through 130-m) via storage medium interface 138. Memory 254 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, memory 254 includes one or more storage devices remotely located from the one or more processing units 127. Memory 254, or alternatively the non-volatile memory device(s) within memory 254, comprises a non-transitory computer readable storage medium. In some embodiments, memory 254, or the non-transitory computer readable storage medium of memory 254, stores the following programs, modules, and data structures, or a subset or superset thereof:

interface module 256 that is used for communicating with other components, such as computer system 110 via host interface 122 and memory channels 160 via storage medium interface 138;

command module 258 for performing various memory operations (e.g., sending read, write/program, and/or erase commands to memory channels 160 in accordance with commands received from computer system 110, or in accordance with internal operations such as garbage collection);

power usage monitor module 260 for processing board power measurement(s) (e.g., measurement of total current drawn by storage device 120 or its memory channel(s)) and/or temperature measurements received from power usage monitor 124 (FIG. 1) or from temperature sensor(s) 224 in one or more memory channels; and power credits module 262, that is used to control a total number of power credits and to allocate power credits to respective channel controllers 130 based on backlog information received from the channel controllers 130, as discussed in more detail below with reference to FIG. 3B.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 254 may store a subset of the modules and data structures identified above. Furthermore, memory 254 may store additional modules and data structures not described above. In some embodiments, the programs, modules, and data structures stored in memory 254, or the computer readable storage medium of memory 254, provide instructions for implementing respective operations in the methods described below with reference to FIGS. 4A-4B and 5A-5B.

Although FIG. 2B shows a management module 121, FIG. 2B is intended more as a functional description of the various features which may be present in a management module than as a structural schematic of the embodiments described herein. In practice, and as recognized by those of ordinary skill in the art, items shown separately could be combined and some items could be separated.

FIG. 3A is a block diagram illustrating an implementation of command queue(s) 212 and a power credits usage per command type data structure 220, in accordance with some embodiments. While some example features are illustrated, various other features have not been illustrated for the sake of brevity and so as not to obscure more pertinent aspects of the example embodiments disclosed herein. To that end, as a non-limiting example, command queue(s) 212 includes a high priority command queue 212-1 and a low priority command queue 212-2. In some embodiments, high priority command queue 212-1 stores commands 302 waiting for execution, and the ages 310 of the respective commands (e.g., read commands and ages of read commands). In some embodiments, different types of commands are stored in different queues (e.g., high priority command queue 212-1 stores read commands 302, and low priority queue 212-2 stores write and erase commands 306). Command execution module 218 of a respective memory channel determines whether to defer execution of commands in the command queue(s) (e.g., command queues 212) for that respective memory channel 160. In some embodiments, more than two command queues 212 are used to store commands waiting for execution. In one example, each of three or more types of commands waiting for execution are stored in different command queues 212.

While in some embodiments a single type of power credit is allocated by the storage controller to the channel controllers, in some other embodiments, there are at least two types of power credits allocated by the storage controller: average power credits and peak power credits. In some embodiments, the total number of average power credits available to be allocated is adjusted based on power usage and/or temperature measurements, when those measurements indicate that power usage by the storage device is above a threshold or is in danger of rising above the threshold, as described in more detail with reference to FIG. 3B.

On the other hand, in some embodiments, the total number of peak power credits to be allocated by the storage controller is static. The total number of peak power credits is based on a characterization of the storage device and the ability of the storage device's power supply 126 to handle power usage spikes. The purpose of peak power credits is to limit the maximum size of power usage spikes that can occur to a magnitude that can be handled by the device. When operations are occurring on many die and hit their peak current simultaneously, the power supply voltage at the storage device may drop below a predefined threshold level, which defines the lowest safe operating voltage for the operating the storage device (e.g., 0.5V below the nominal supply voltage), if the peak current used by the storage device exceeds a maximum load, or a rate of change of the current used by the storage device exceeds a maximum rate. In some embodiments, the use of a peak power credit limit ensures that the power supply voltage at the storage device does not drop below the threshold level, below which operation of the storage device may be adversely impacted.

In some embodiments, power credits usage per command type data structure 220 stores information based on different command types (e.g., read commands, write commands, erase commands). In some embodiments, the information stored for each type of command includes an average power credit value 314 and a peak power credit value 316. For example, in some embodiments, power credits usage per command type data structure 220 is a table having information (e.g., in a record) for each of a plurality of commands types (e.g., command types 1 to p). In some embodiments, the table includes a single power credit usage value 314 (shown in FIG. 3A as the "average" power credit usage) for each command type, while in other embodiments the table includes two distinct power credit usage values (e.g., average power credit usage 314, and peak power credit usage 316) for each command type. The distinction between average power credit usage and peak power credit usage is explained below with reference to FIGS. 5A-5B. In some embodiments, each type of command is assigned a different number of power credits. Examples of the subsystem for which power is monitored are discussed below with reference to FIG. 3B.

FIG. 3B is a block diagram illustrating an acquisition of board power measurement(s) 320 and pending command backlogs processed by a management module, in accordance with some embodiments. While some example features are illustrated, various other features have not been illustrated for the sake of brevity and so as not to obscure more pertinent aspects of the example embodiments disclosed herein. In particular, the mechanisms shown in FIG. 3B will first be described for embodiments in which a single type of power credit is allocated among the channel controllers 130, and thereafter will be described for embodiments in which two or more types of power credit are allocated among the channel controllers 130.

As a non-limiting example, board power measurements and/or temperature measurements 320 (e.g., measurements of total current drawn by the memory channels and/or temperature measurements), are collected by power usage monitor 124. The collected measurements are received by power usage monitor module 260, and used by power credits module 262 to determine and update the total power credits available, or in some embodiments that use two or more types of power credits, power credits module 262 determines and updates the total average power credits available. It is noted that while a measurement of the total current drawn by a storage device or its memory channels is not, strictly speaking, the same as a measurement of power usage, it is effectively a power measurement because the voltage level at which the current is provided to the storage device is a known, substantially fixed, voltage level. Stated another way, fluctuations in the voltage level of the supplied power are sufficiently small during ordinary usage of the storage device that measurements of current drawn are a good proxy for measurements of power usage. Therefore, in some embodiments, power is measured by measuring total current drawn by the storage device, the storage device's memory channels, or some other predefined portion of the storage device.

In some embodiments, the total power credits available are determined as a function of the received power measurement(s):

$$TotalCredits = TPCfunction(power\ measurement(s))$$

where TotalCredits are the total power credits available (e.g., in embodiments using a single type of power credits), and TPCFunction( ) maps the power and/or temperature measurements 320 to a value of the total power credits available. In some embodiments, TPCFunction( ) is a non-linear function, having a default value (e.g., a value configured or set during manufacturing or initial testing of the storage device) for values of the power and/or temperature measurement(s) 320 below a predefined threshold for embodiments having a single power/temperature measurement, or below a set of predefined thresholds (e.g., one threshold for total current drawn by storage device or its memory channels and another threshold for the temperature), and values that decrease from the default value linearly or non-linearly for values of the power/temperature measurement(s) above the predefined threshold(s). In one example, in which total current drawn and temperature are both monitored, TPC-Function( ) is equal to the lesser of two values, (A) defaultValue−Fcn1(MeasuredCurrent), and (B) defaultValue−Fcn2 (MeasuredTemperature), where defaultValue is the amount of power credits available for allocation (e.g., in a respective epoch) when both the measured current and measured temperature are below their respective thresholds, Measured Current is the measured current, Fcn1 is a function of the measured current that has a positive non-zero value only when measured current is above a predetermined threshold current, MeasuredTemperature is the measured temperature, and Fcn2 is a function of the measured temperature that has a positive non-zero value only when measured temperature is above a predetermined threshold temperature. In some embodiments, other functions (e.g., nonlinear functions) are used to determine the total power credits available for allocation.

When the power/temperature measurement(s) exceed the predefined threshold(s), this indicates that the storage device is using more power, on average, than allowed, and therefore the total power credits available is reduced. Reducing the total power credits available will result in fewer commands being executed per unit of time (sometimes called epochs), which will reduce the total or average power used by the storage device, which, in turn, will reduce the temperature of the storage device or the portion of the storage device monitored by power usage monitor 124.

It is noted that operating the storage device at a temperature above a critical temperature may result in failure of the storage device to retain data or otherwise operate properly. Therefore, to prevent that from happening, in embodiments that monitor temperature of the storage device, or monitor temperature of one or more portions or components of the storage device (e.g., using temperature sensors 224 in memory channels 160, see FIG. 2A), a threshold temperature that is below the critical temperature associated with device failure is used as the predetermined threshold temperature. In some embodiments that measure temperature at more than one location within the storage device, e.g., by measuring temperature of two or more portions (e.g., memory channels 160) or components of the storage device, the highest measured temperature of the two or more portions or components of the storage device is used as the measured temperature; in some other embodiments, an average or other predefined combination of the measured temperatures of the two or more portions or components of the storage device is used as the measured temperature. When the measured temperature is above the predetermined threshold temperature, total power credits allocated by storage controller 128 (e.g., management module 121, or power credits module 262) are reduced.

As explained in more detail below, in some embodiments, power credits are determined and allocated by storage controller 128 for successive predetermined time periods, often called epochs, in a sequence of predetermined time periods. For example, the sequence of predetermined time periods may be successive time periods of duration T1 (e.g., 1 second, or more generally a value in the range of 0.1 second to 10 seconds), and for each such time period storage controller 128 determines the total power credits available for allocation, and the specific power credit(s) to be allocated to each storage controller (or, equivalently, to each memory channel).

Above, the determination of total power credits available has been described for embodiments in which a single type of power credit is allocated by the storage controller to the channel controllers (or, equivalently, the memory channels). In some embodiments in which two or more types of power credits are allocated by the storage controller to the channel controllers, the above-described TPCFunction( ) maps the power and/or temperature measurements to a value of the total average power credits available for allocation. In some such embodiments, the total number of average power credits available to be allocated is adjusted, based on power usage measurements and/or temperature measurements for storage device 120 or a subsystem of storage device 120 (e.g., temperature measurements by power usage monitor 124), when those measurements indicate that the temperature of the storage device, or a subsystem of the storage device, is above a threshold temperature or is in danger of rising above the threshold temperature, as described in more detail with reference to FIG. 3B. In particular, in some embodiments, "temperature throttling" is accomplished by reducing the total number of power credits to be allocated (in embodiments using a single type of power credit) or reducing the number of average power credits to be allocated (in embodiments using two or more types of power credits) when the temperature of the storage device is above a threshold temperature. In some embodiments, temperature throttling is also performed to reduce the total power credits available, or the number of average power credits available, when the rate of change of the measured temperature of the storage device, or a subsystem of the storage device, is above a rate threshold.

In some embodiments, power credits module 262 receives backlog information from channel controllers 130. At the channel controllers 130, backlog determination modules 216 determine, for each memory channel, a backlog corresponding to the number, type and age of the pending commands in the command queues of that memory channel. As explained above with reference to FIG. 3A, in some embodiments, pending read commands are placed in high priority command queue 212-1, while other commands (e.g., write and erase commands) are placed in low priority command queue 212-2 (or, alternatively, in one or more low priority command queues). Further, for purposes of determining the backlog in each memory channel, some commands, such as high priority read commands, are assigned different weights based on age (e.g., how long each such command has been pending, as indicated by a timestamp value for the command). As described above with reference to in FIG. 3A, in some embodiments, command age information 310 is stored for each command in high priority command queue 212-1. In some embodiments, a backlog score is generated and conveyed by each the channel controller 130 of each memory channel to power credits module 262 of storage controller 128. For example, in some embodiments, the backlog score generated by the channel controller 130 of a respective memory channel is:

$$\text{Backlog} = w*(\Sigma_i \text{age}_i) + LP\_queue\_level$$

where w is a weighting factor, i is an index for the pending commands in the high priority command queue 212-1, each $\text{age}_i$ value is the age of a corresponding high priority command, as measured in predefined units of time (e.g., number of microseconds), and LP_queue_level is the number of commands in the low priority command queue 212-2. In another example, the backlog score generated by the channel controller 130 of a respective memory channel is:

$$\text{Backlog} = (\Sigma_i \text{weight}(\text{age}_i)) + LP\_queue\_level$$

where weight( ) is a function that maps age values to weights, i is an index for the pending commands in the high priority command queue 212-1, each $age_i$ value is the age of a corresponding high priority command, as measured in predefined units of time (e.g., number of microseconds), and LP_queue_level is the number of commands in the low priority command queue 212-2. In some embodiments, the weight( ) function is a non-linear function, for example a non-linear function that maps ages close to a predefined limit to significantly higher weights than ages that are far below the predefined limit. For example, if the predefined limit is 1 millisecond, any age between 10 microseconds and 500 microseconds is be mapped to a value of n*age, and any age above 500 microseconds is mapped to a value of 2*n*age, where n is a fixed scaling value.

In some other embodiments, the backlog information conveyed by the channel controller 130 of each memory channel 160 to power credits module 262 of storage controller 128 includes information about the number of pending commands in the corresponding memory channel's low priority command queue 212-1 and the number and age of pending commands in the corresponding memory channel's high priority command queue 212-2. In some such embodiments, storage controller 128 (e.g., power credits module 262 in storage controller 128) generates a backlog score for each respective memory channel based on the backlog information received from the channel controller 130 of the respective memory channel.

In accordance with the backlog information received from the channel controllers (e.g., received by power usage monitor module 260), and the total power credits available (e.g., determined by power credits module 262), power credits module 262 allocates power credits (e.g., average power credits and peak power credits) to respective channel controllers.

In some embodiments, the power credits allocated to a respective memory channel, or its channel controller, are based on its proportion of the overall backlog score for all the memory channels in the storage device. For example, in some embodiments, the power credits allocated to any particular memory channel is:

$$\text{PowerCreditAllocated}(c) = \text{TotalCredits} * \frac{\text{BacklogScore}_m}{\Sigma_i \text{BacklogScore}_i}$$

where c identifies the memory channel to which the power credit is allocated, i is an index for the memory channels (e.g., memory channels 1 to m), TotalCredits are the total power credits available, and $\text{BacklogScore}_i$ is the backlog score obtained from channel controller i.

Figure 4A:
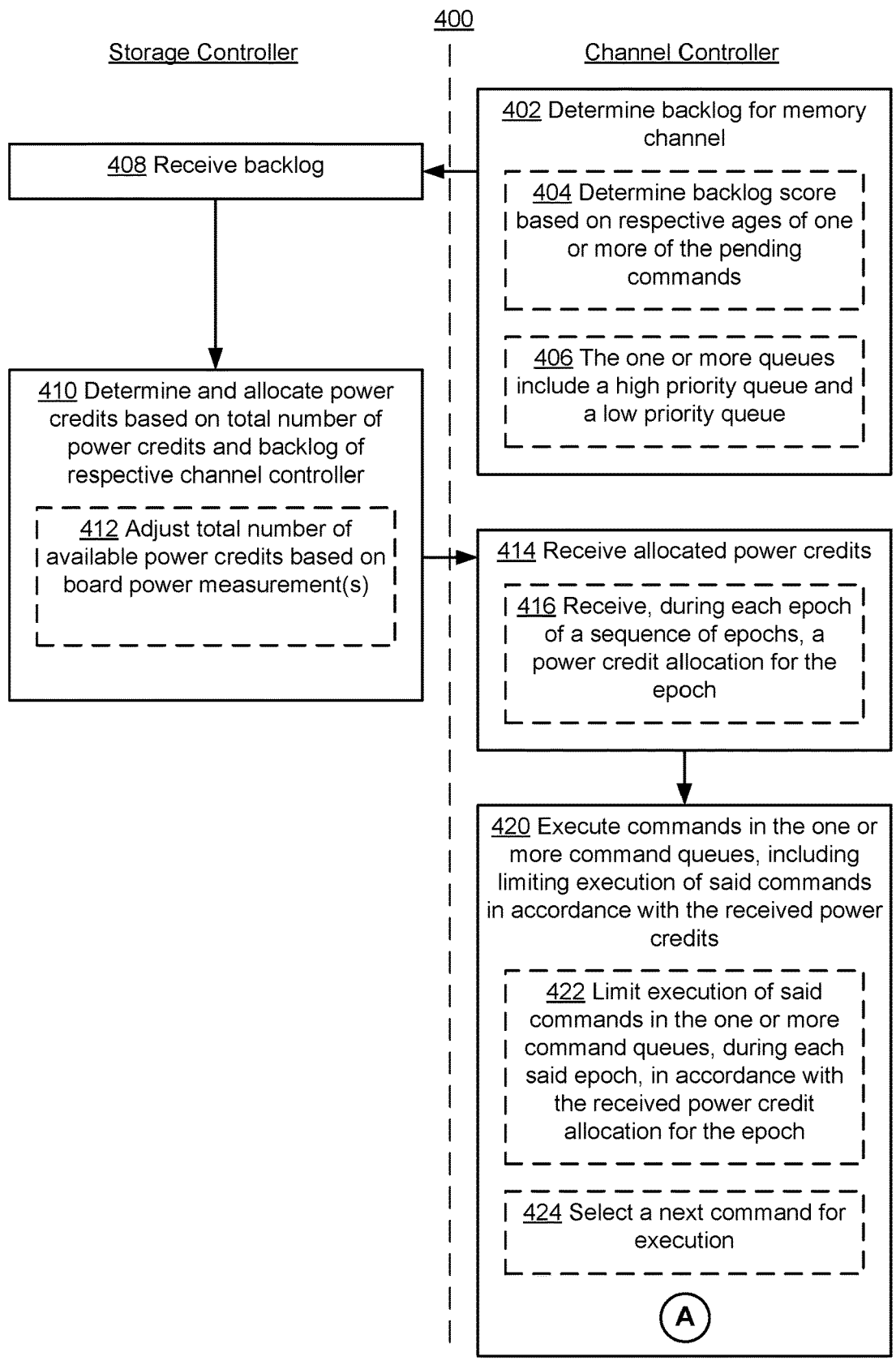

FIGS. 4A-4B illustrate a flowchart representation a method 400 of allocating power credits to one or more channel controllers in a memory system (e.g., storage device 120) and limiting execution of commands in one or more command queues, in accordance with some embodiments. Method 400 is performed in a non-volatile memory system (e.g., storage device 120, FIG. 1), which includes a plurality of memory channels 160, each memory channel including a channel controller 130 and distinct sets of non-volatile memory devices (e.g., NVM devices 140-1 through 140-n, and NVM 142-1 through 142-k), and which coordinates and manages multiple sub-system components to limit execution of commands in the command queues of two or more memory channels in accordance with power credits allocated to those memory channels. More specifically, in some embodiments, some portions of method 400 are performed by the channel controller of each of two or more of the memory channels, while other portions are performed by the system's storage controller.

In some embodiments, a respective channel controller determines a backlog of the respective channel controller (402), as described above in further detail with respect to FIG. 3B. In some embodiments, as explained above in more detail with reference to FIG. 3B, a backlog score is calculated, based on pending commands in the one or more command queues of the channel controller, by giving different weights to pending commands based on command type and age of the pending commands (404). In some embodiments, the one or more queues of the respective channel controller include a high priority queue for read commands and a low priority queue for write and erase commands (406). Optionally, pending commands in the high priority queue (e.g., read commands) are given more weight in the backlog calculation than pending commands in the low priority queue (e.g., write and erase commands).

In some embodiments, the aforementioned backlog determination is performed by each respective channel controller of the plurality of channel controllers in the memory system in accordance with pending commands (i.e., command waiting for execution) in the one or more command queues of that respective channel controller. In some embodiments, each respective channel controller of the plurality of channel controllers in the memory system is configured to determine a backlog score based at least in part on respective ages of one or more of the commands in the one or more command queues of the respective channel controller.

In some embodiments, each respective channel controller of the plurality of channel controllers in the memory system is configured to determine a backlog score in accordance with a count of commands whose execution was deferred by the respective channel controller, in an epoch prior to a current epoch (e.g., the epoch immediately prior to the current epoch), in accordance with a determination (e.g., a determination for each such command) that executing those commands would have required power credits in excess of power credits available in the respective channel controller during that prior epoch. Deferral of command execution is discussed below with respect to operations 420-426.

Furthermore, in some embodiments, the storage controller receives backlog information from the respective channel controller (408). At the storage controller, as shown in FIG. 3B, power credits module 262 receives the backlog information and allocates a portion of the total number of available power credits based on backlog information for the respective channel controller (410). As a non-limiting example, if the backlog for channel controller 130-1 is lower (or smaller) than the backlog for channel controller 130-2, more power credits are allocated to channel controller 130-2 than channel controller 130-1. Furthermore, in some embodiments, distribution of power credits is limited by the total number of available power credits, which is adjusted in accordance with board power measurements described in FIG. 3B (412).

As explained in more detail above with reference to FIG. 3B, in some embodiments the total number of available power credits is adjusted, or determined, at the storage controller based at least in part on one or more temperature measurements. Alternatively, or in addition, the total number of available power credits is adjusted, or determined, at the storage controller based at least in part on one or more board power measurements.

As explained in more detail above, with reference to FIG. 3B, the storage controller controls (e.g., determines) a total number of available power credits (e.g., based on measured power usage and/or measured temperature) and distributes power credits to the respective channel controller of the plurality of channel controllers based on the total number of power credits and the backlog of the respective channel controller. In some embodiments, the distribution of power credits is based on the proportion of the backlog of each memory channel controller compared to the sum of the backlogs across all memory channel controllers, sometimes called a pro rata distribution of the available power credits. Furthermore, the storage controller allocates power credits to the respective channel controller for each epoch of a sequence of epochs, in accordance with some embodiments. Correspondingly, the respective channel controller, during each epoch in the sequence of epochs, receives a power credit allocation for the epoch (416).

In some embodiments, each respective channel controller limits execution of commands in accordance with the received power credits (420). The execution of commands may include the execution of the commands by the non-volatile memory devices controlled by the channel controller. Furthermore, in some embodiments, each respective channel controller is configured to perform operations during each epoch of the sequence of epochs, including receiving a power credit allocation for the epoch (see 416), and limiting execution of commands in the one or more command queues of the channel controller, during the epoch, in accordance with the received power credit allocation for the epoch (422).

In some embodiments, the channel controller defers execution of a command if executing said command would require power credits in excess of the power credits available in the channel controller (426) (e.g., power credits available can be the total number of power credits allocated to the respective channel controller during said epoch, minus the number of power credits assigned to command(s) currently being executed in the respective channel controller). As described in FIG. 3A, each command type has an assigned number of power credits (428), and execution of a respective command is deferred if the number of power credits assigned to the command type of the respective command exceeds the power credits available.

In some embodiments, each respective channel controller updates the power credits available in the respective channel controller by reducing the available power credits when execution of a respective command is initiated (e.g., by subtracting the number of power credits assigned to the command(s) currently being executed in the corresponding memory channel), and increasing the available power credits when execution of the respective command completes (e.g., by adding the number of power credits assigned to the respective command whose execution has completed) (432). Alternatively, in some embodiments, each respective channel controller updates the power credits available in the respective channel controller by setting, at the beginning of each epoch, the power credits available in the respective channel controller to the power credits allocated to the respective channel controller for the current epoch, and subtracting the number of power credits assigned to command(s) whose execution is initiated during the current epoch.

From another viewpoint, in some embodiments, each respective channel controller determines a number of in use power credits, based on commands currently being executed by the respective channel controller (e.g., based on the number of power credits assigned to the command(s) currently being executed in the corresponding memory channel), and determines the power credits available in the respective channel controller in accordance with the received power credits allocated by the storage controller (e.g., allocated by operations 410, 412, 414, 416) and the in use power credits (432).

In some embodiments, the channel controller selects (424) a next command for execution in accordance with predefined command selection criteria. For example, in some embodiments, so long as there are sufficient power credits available, the channel controller selects a next command (from among the pending commands in the one or more command queues) for execution in accordance with a predefined priority scheme. More particularly, in one example, the priority scheme is to execute commands in the high priority queue first, in order of age (i.e., executing the oldest commands in the high priority queue first), before executing commands in the low priority queue. However, in some embodiments, if the next command that would be selected in accordance with the priority scheme would use more power than the available power credits, the channel controller selects for execution another pending command, if any, for which the available power credits are sufficient (i.e., where the selected pending command would use no more power credits than the available power credits).

Figure 5A:
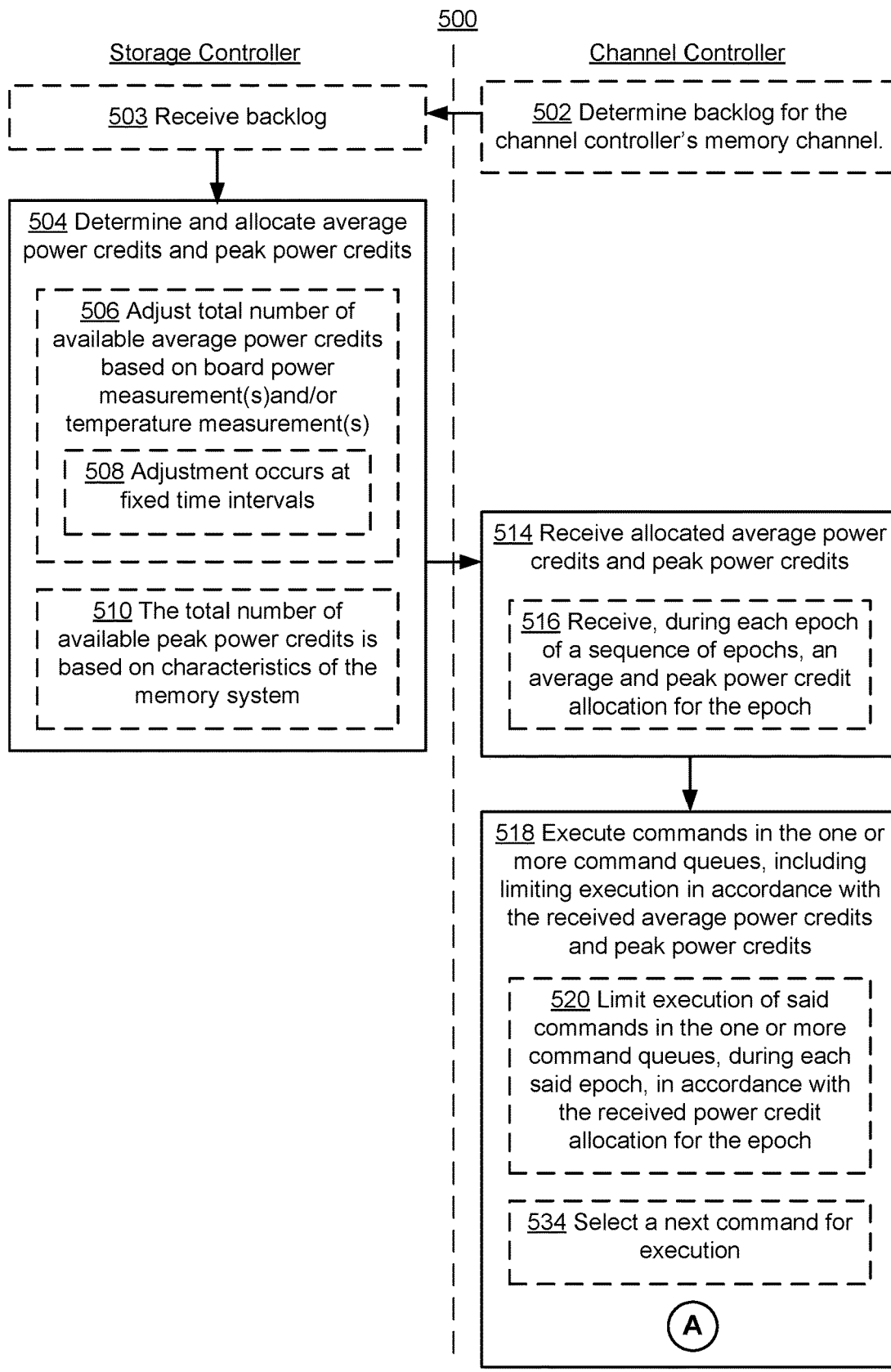

FIGS. 5A-5B illustrate a flowchart representation a method 500 of allocating average power credits and peak power credits to one or more channel controllers and limiting execution of commands in one or more command queues, in accordance with some embodiments. Method 500 is performed in a non-volatile memory system (e.g., storage device 120, FIG. 1) having a storage controller and a plurality of distinct sets of non-volatile memory devices. The non-volatile memory system includes a plurality of memory channels 160, each memory channel including a channel controller 130 and a distinct set of non-volatile memory devices (e.g., NVM devices 140-1 through 140-n, or NVM 142-1 through 142-k) of the plurality of distinct sets of non-volatile memory devices. The non-volatile memory system coordinates and manages multiple sub-system components to defer execution of commands in the command queues of two or more memory channels, each of which corresponds to a distinct set of non-volatile memory devices. More specifically, in some embodiments, some portions of method 500 are performed by the channel controller of each of two or more of the memory channels, while other portions are performed by the memory system's storage controller. The memory system that performs method 500 also typically includes an interface (e.g., host interface 122, FIGS. 1 and 2B) for coupling the memory system to one or more host systems, as shown in FIG. 1, and the commands pending in the one or more command queues of the memory channels include commands corresponding to memory access commands received from the one or more most systems.

In some embodiments, a respective channel controller 160 determines backlog information for that channel controller's memory channel (502). Methods for determining the backlog information are discussed above with respect to FIGS. 3A-3B and 4A-4B; the embodiments discussed above with respect to method 400, with respect to backlog determination, are equally applicable to method 500. In some embodiments, the storage controller receives backlog information from the respective channel controller (503), determines average power credits and peak power credits, and allocates the average power credits and peak power credits to channel controllers 130 (504), or to the corresponding memory channel. Average power credits and peak power credits are described above in more detail with reference to FIG. 3A. In some embodiments, average power credits and peak power credits are each allocated using a method that is similar in some respects to the method described above with reference to FIGS. 4A-4B. In some embodiments, two power credit allocations (e.g., average power credit allocation and peak power credit allocation) are determined for each memory channel as follows:

$$\text{AvgPowerCreditAllocated}(c) = \text{TotalAvgCredits} * \frac{\text{BacklogScore}_m}{\Sigma_i \text{BacklogScore}_i}$$

$$\text{PeakPowerCreditAllocated}(c) = \text{TotalPeakCredits} * \frac{\text{BacklogScore}_m}{\Sigma_i \text{BacklogScore}_i}$$

where c identifies the memory channel to which the power credit is allocated, i is an index for the memory channels (e.g., memory channels 1 to m), TotalAvgCredits is the total number of average power credits available, TotalPeakCredits is the total number of peak power credits available, and $\text{BacklogScore}_i$ is the backlog score obtained from (or, alternatively, determined for) channel controller i.

In some embodiments, the total number of available average power credits is variable, and is adjusted based on one or more board power measurement(s) and/or temperature measurement(s) (506), as described above in more detail with reference to FIG. 3B. In some embodiments, the adjustment occurs at fixed time intervals (508) (e.g., 10 times per second, or 1 time per second). In some embodiments, the total number of available peak power credits is fixed, based on characteristics of the memory system (510) (e.g., power spike handling of power supply). In some embodiments, the allocation of peak power credits is based on the peak power credit needs of commands waiting for execution (also called pending commands) in each memory channel. Furthermore, in some embodiments, the storage controller allocates average power credits and peak power credits to the respective channel controller for each epoch of a sequence of epochs. Correspondingly, the respective channel controller, during each epoch in the sequence of epochs, receives an average power credit allocation and a peak power credit allocation for the epoch (516). From a system viewpoint, each respective channel controller of a plurality of channel controllers in the memory system (e.g., storage device 120) receives power credits allocated by the storage controller, including an average power credit and a peak power credit. It is noted that each such channel controller corresponds to a distinct set of the plurality of distinct sets of non-volatile memory devices in the memory system.

In some embodiments, each respective channel controller limits execution of commands in accordance with the received average power credits and the received peak power credits (518). The execution of commands may include the execution of the commands by the non-volatile memory devices controlled by the channel controller. Furthermore, in some embodiments, each respective channel controller is configured to perform operations during each epoch of the sequence of epochs (see 516), including receiving an average and peak power credit allocation for the epoch, and limiting execution of said commands in the one or more command queues in accordance with the received average power credit allocation and peak power credit allocation for the epoch (520).

In some embodiments, limiting execution of the pending commands (518) includes deferring execution of a command if executing the command would require average power credits in excess of the average power credits available in the channel controller (522) or executing the command would require peak power credits in excess of the peak power credits available (526) in the channel controller. As described above with reference to FIG. 3A, in some embodiments, each command type has an assigned number of average power credits and peak power credits (524, 528), and execution of a respective command is deferred if the number of average power credits assigned to the command type of the respective command exceeds the average power credits available (522) or if the number of peak power credits assigned to the command type of the respective command exceeds the peak power credits available (526). Thus, if either type of power usage limit would be exceeded by execution of the respective command, execution of the respective command is deferred.

In some embodiments, the average power credits available in a respective channel controller are the total number of average power credits allocated to the respective channel controller during the current epoch, minus the number of average power credits assigned to command(s) currently being executed in the respective channel controller. Similarly, in some embodiments, the peak power credits available in a respective channel controller are the total number of peak power credits allocated to the respective channel controller during the current epoch, minus the number of peak power credits assigned to command(s) currently being executed in the respective channel controller.

In some other embodiments, the average power credits available in a respective channel controller are the total number of average power credits allocated to the respective channel controller during the current epoch, minus the number of average power credits assigned to command(s) whose execution was initiated during the current epoch. Similarly, in some embodiments, the peak power credits available in a respective channel controller are the total number of peak power credits allocated to the respective channel controller during the current epoch, minus the number of peak power credits assigned to command(s) whose execution was initiated during the current epoch. In some embodiments, for each type of command, the average power credits assigned to the command type and the peak power credits assigned to the command type are the same, while in other embodiments these are distinct values.

In addition, in some embodiments, the epochs for peak power credits and the epochs for average power credits have different durations. For example, in some embodiments, the epochs for average power credits have a duration that is L times as long as the epochs for peak power credits, where L is a value between two and ten. As a result, in such embodiments, operation 410 for allocating power credits is performed more often for allocating peak power credits to each of the respective channel controllers than it is performed by for allocating average power credits to each of the respective channel controllers.

In some embodiments, each respective channel controller updates the average power credits available and the peak power credits available in the respective channel controller by reducing the available average and peak power credits when execution of a respective command is initiated (e.g., by subtracting the number of average power credits assigned to the command(s) currently being executed in the corresponding memory channel from the average power credits available, and subtracting the number of peak power credits assigned to the command(s) currently being executed in the corresponding memory channel from the peak power credits available), and increasing the available average and peak power credits when execution of the respective command completes (e.g., by adding the number of average power credits assigned to the respective command whose execution has completed to the available average power credits in the corresponding memory channel, and adding the number of peak power credits assigned to the respective command whose execution has completed to the available peak power credits in the corresponding memory channel) (532).

From another viewpoint, in some embodiments, each respective channel controller maintains two power credit pools, an average power credit pool and a peak power credit pool. The respective channel controller maintains a distinct available power credit level for each of the two pools. Initial values of the average and peak available power credit levels for the two power credit pools, which are also maximum values for the two power credit pools, are determined in accordance with the considerations discussed above. Each time a command is dequeued from a command queue for execution, the average and peak available power credit levels for the two power credit pools are updated by subtracting the corresponding number of average and peak power credits assigned to that command, respectively. In some embodiments, the same numbers of average and peak power credits are added back to the two power credit pools when execution of the command completes. In some other embodiments, however, average and peak power credits are not added back to the two power credit pools when execution of the command completes, and instead the average power credit pool is periodically restored to a first level (e.g., a level equal to the average power credits allocated by the storage controller to the respective channel controller or its memory channel for the current epoch) each time a time period having a first predetermined duration expires and similarly the peak power credit pool is periodically restored to a second level (e.g., a level equal to the peak power credits allocated by the storage controller to the respective channel controller or its memory channel for the current epoch) each time a time period having a second predetermined duration expires. Typically, the time periods with the first predetermined duration (for the average power credit pool) are longer than the time periods with the second predetermined duration (for the peak power credit pool).

In some embodiments of method 500, the channel controller selects (534) a next command for execution. For example, in some embodiments, so long as there are sufficient average power credits available and peak power credits available, the channel controller selects a next command (from among the pending commands in the one or more command queues) for execution in accordance with a predefined priority scheme. More particularly, in one example, the priority scheme is to execute commands in the high priority queue first, in order of age (i.e., executing the oldest commands in the high priority queue first), before executing commands in the low priority queue. However, in some embodiments, if the next command that would be selected in accordance with the priority scheme would use more average power credits than the available average power credits, or if the next command that would be selected in accordance with the priority scheme would use more peak power credits than the available peak power credits, the channel controller selects for execution another pending command, if any, for which the available average power credits and available peak power credits are sufficient (i.e., where the selected pending command would require no more average power credits than the available average power credits and no more peak power credits than the available peak power credits).

From another viewpoint, in some embodiments, each respective channel controller determines a number of in use average power credits and in use peak power credits, based on commands currently being executed by the respective channel controller (e.g., based on the number of average power credits and peak power credits assigned to the command(s) currently being executed in the corresponding memory channel), and determines the average power credits available and the peak power credits available in the respective channel controller in accordance with the received average power credits and peak power credits allocated by the storage controller and the in use average power credits and the in use peak power credits (532).

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the second device are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A memory system, comprising:
   a plurality of distinct sets of non-volatile memory devices;
   a storage controller;
   a plurality of channel controllers, each respective channel controller corresponding to a distinct set of the plurality of distinct sets of non-volatile memory devices, each respective channel controller having one or more command queues for holding the respective channel controller's pending commands and configured to:
- receive power credits allocated by the storage controller, wherein each respective channel controller is configured to receive an average power credit and a peak power credit;
- execute commands in the one or more command queues, including limiting execution of said commands in accordance with the received average power credit and the received peak power credit, wherein each respective channel controller is configured to limit execution of said commands based on a determination that a number of received average power credits and/or peak power credits meets excess power credit criteria; and
- wherein a total number of average power credits allocated by the storage controller is variable and a total number of peak power credits allocated by the storage controller is fixed.

2. The memory system of claim 1, wherein the total number of peak power credits at the storage controller is based on characteristics of the memory system.

3. The memory system of claim 1, wherein the storage controller is configured to adjust the total number of average power credits based at least in part on one or more board power measurements.

4. The memory system of claim 1, wherein the storage controller is configured to adjust the total number of average power credits based at least in part on one or more temperature measurements.

5. The memory system of claim 3, wherein the adjustment of the total number of average power credits at the storage controller occurs at fixed time intervals.

6. The memory system of claim 1, wherein limiting execution includes deferring execution of a respective command in the one or more command queues in accordance with a determination that executing the respective command would require average power credits in excess of average power credits available in the respective channel controller or that executing the respective command would require peak power credits in excess of peak power credits available in the respective channel controller.

7. The memory system of claim 6, wherein said commands include commands having different command types, each command type having an assigned number of average power credits and peak power credits, and each respective channel controller is configured to defer execution of a respective command of the respective channel controller's pending commands in accordance with a determination that the number of average power credits assigned to the command type of the respective command exceeds the average power credits available in the respective channel controller or the peak power credits assigned to the command type of the respective command exceeds the peak power credits available in the respective channel controller.

8. The memory system of claim 6, wherein each respective channel controller is configured to update the average power credits and the peak power credits available in the respective channel controller by reducing the available average power credits and the available peak power credits when execution of a respective command is initiated, and increasing the available average power credits and available peak power credits when execution of the respective command completes.

9. The memory system of claim 6, wherein each respective channel controller is configured to:
- determine a number of in use average power credits, based on commands currently being executed by the respective channel controller, and determine the average power credits available in the respective channel controller in accordance with the received average power credits allocated by the storage controller and the number of in use average power credits; and
- determine a number of in use peak power credits, based on commands currently being executed by the respective channel controller, and determine the peak power credits available in the respective channel controller in accordance with the received peak power credits allocated by the storage controller and the number of in use peak power credits.

10. The memory system of claim 1, wherein each respective channel controller is configured to receive, during each epoch of a sequence of epochs, an average power credit allocation and a peak power credit allocation for the epoch, and to limit execution of said commands in the one or more command queues, during each said epoch, in accordance with the received average power credit allocation and the received peak power credit allocation for the epoch.

11. The memory system of claim 1, wherein:
- each respective channel controller of the plurality of channel controllers is configured to determine a backlog of the respective channel controller and provide the determined backlog to the storage controller;
- the average power credit received by each respective channel controller is based at least in part on the determined backlog provided by the respective channel controller to the storage controller.

12. The memory system of claim 11, wherein each respective channel controller is configured to determine the backlog score of the respective channel controller in accordance with a count of commands whose execution was deferred by the respective channel controller, in an epoch prior to a current epoch, in accordance with a determination that executing those commands would have required power credits in excess of power credits available in the respective channel controller during the prior epoch.

13. The memory system of claim 11, wherein each respective channel controller is configured to determine the backlog score of the respective channel controller in accordance with pending commands in the one or more command queues waiting for execution.

14. A method of operation in a memory system having a storage controller and a plurality of distinct sets of non-volatile memory devices, the method comprising:
- at each respective channel controller of a plurality of channel controllers, each channel controller corresponding to a distinct set of the plurality of distinct sets of non-volatile memory devices, each respective channel controller having one or more command queues for holding the respective channel controller's pending commands:
  - receiving power credits allocated by the storage controller, wherein each respective channel controller is configured to receive an average power credit and a peak power credit;
  - executing commands in one or more command queues, including limiting execution of said commands in accordance with the received average power credit and the received peak power credit, wherein each respective channel controller is configured to limit execution of said commands based on a determination that a number of received average power credits and/or peak power credits meets excess power credit criteria; and at the storage controller, allocating a variable total number of average power credits and allocating a fixed total number of peak power credits.

15. The method of claim 14, including determining the total number of peak power credits based on characteristics of the memory system.

16. The method of claim 14, including adjusting the total number of average power credits based at least in part on one or more board power measurements.

17. The method of claim 14, including adjusting the total number of average power credits based at least in part on one or more temperature measurements.

18. The method of claim 16, further comprising adjusting the total number of average power credits at fixed time intervals.

19. A memory system, comprising:
a plurality of distinct sets of non-volatile memory devices;
a storage controller;
a plurality of channel controllers, each respective channel controller corresponding to a distinct set of the plurality of distinct sets of non-volatile memory devices, each respective channel controller having one or more command queues for holding the respective channel controller's pending commands and including:
means for receiving power credits allocated by the storage controller, wherein each respective channel controller is configured to receive an average power credit and a peak power credit; and
means for executing commands in the one or more command queues, including limiting execution of said commands in accordance with the received average power credit and the received peak power credit, wherein each respective channel controller is configured to limit execution of said commands based on a determination that a number of received average power credits and/or peak power credits meets excess power credit criteria.

* * * * *